United States Patent [19]

Muramoto

[11] Patent Number: 4,761,526
[45] Date of Patent: Aug. 2, 1988

[54] APPARATUS FOR READING DISPLAYED VALUE OF ELECTRONIC CLINICAL THERMOMETER

[75] Inventor: Yutaka Muramoto, Fujinomiya, Japan

[73] Assignee: Terumo Kabushiki Kaisha, Tokyo, Japan

[21] Appl. No.: 46,292

[22] Filed: May 4, 1987

[30] Foreign Application Priority Data

May 12, 1986 [JP] Japan ................................ 61-106763
May 12, 1986 [JP] Japan ................................ 61-106764

[51] Int. Cl.⁴ ............................................. B65D 85/38
[52] U.S. Cl. .................................... 206/306; 364/557; 374/142; 382/1
[58] Field of Search ................... D 24/8, 17; 128/630, 128/736; 206/306; 323/911; 364/557; 374/142; 382/1

[56] References Cited

U.S. PATENT DOCUMENTS 3,772,685 11/1973 Masi ................................ 340/36 SC
4,109,527 8/1978 Goode, Jr. ............................ 374/142
4,574,359 3/1986 Ishizaka et al. ...................... 364/557

*Primary Examiner*—Patrick R. Salce
*Assistant Examiner*—Jeffrey Sterrett

*Attorney, Agent, or Firm*—Frishauf, Holtz, Goodman & Woodward

[57] ABSTRACT

An apparatus for reading temperature values displayed by a plurality of electronic clinical thermometers includes a reader for reading the displayed temperature values, a retainer for retaining the electronic clinical thermometers in such a manner that temperature display sections thereof are positioned on the reader side, and moving means for moving the retainer and reader relative to each other so that the reader reads the displayed temperature values from the thermometers. In another aspect, the apparatus includes a reader for reading temperature values displayed displayed values by a plurality of electronic clinical thermometers, a retainer for retaining the electronic clinical thermometers in such a manner that temperature display sections thereof are positioned to face the reader, information generating means for generating patient identifying information corresponding to each position at which a thermometer is held in the retainer, moving means for moving the retainer and reader relative to each other so that the reader reads the displayed values from the thermometers, and an output unit for specifying displayed values, by the patient identifying information, read by the reader, and for outputting the displayed values so specified to an external unit.

13 Claims, 12 Drawing Sheets

| No | Name | Data |
|---|---|---|
| ① | John Doe | 36.3 |
| ② | | |
| ③ | | |
| ④ | | |
| ～ | | |
| ⓝ | | |

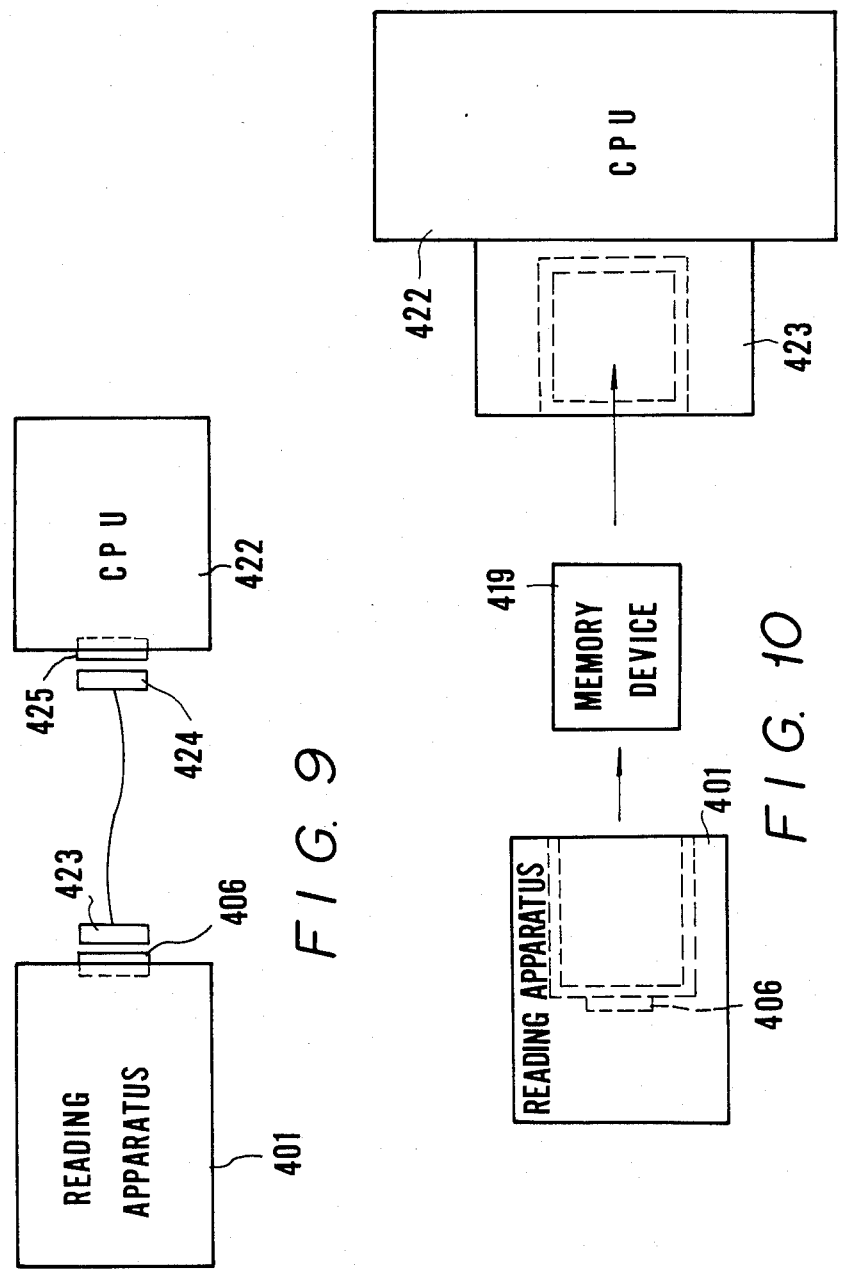

APPARATUS FOR READING DISPLAYED VALUE OF ELECTRONIC CLINICAL THERMOMETER

BACKGROUND OF THE INVENTION

This invention relates to an apparatus for reading or storing measured temperature values displayed by an electronic clinical thermometer, and for outputting read temperature display values to an external unit together with patient identifying information.

One example of a sterilizable electronic clinical thermometer is a so-called "one-piece" electronic clinical thermometer. In order to enhance the quality of its seal, such a thermometer does not possess a connector or the like for connection to external equipment. Consequently, after one-piece electronic clinical thermometers have been used to measure the temperatures of a number of patients at a hospital or the like, the temperature values of the respective patients are recorded in a notebook or the like by a nurse. This is a troublesome operation and invites clerical error in terms of writing down the temperature values if a large number of patients are involved.

Even if an arrangement is adopted in which a one-piece electronic clinical thermometer is provided with a connector for connection to external equipment and the temperature data are transmitted to the external equipment via the connector, labor is required to connect a large number of such thermometers to the external equipment. As a result, the temperature data cannot be converted into a machine processable form efficiently.

SUMMARY OF THE INVENTION

Accordingly, an object of the present invention is to provide an apparatus whereby display values outputted by a plurality of sealed clinical thermometers can be read indirectly and converted into machine processable data.

Another object of the present invention is to provide a portable apparatus whereby values displayed by a number of sealed electronic clinical thermometers can be read in a short period of time, converted into machine processable data and stored as such data.

According to the present invention, the foregoing object is attained by providing an apparatus for reading temperature values displayed by a plurality of electronic clinical thermometers, the apparatus comprising: reading means for reading temperature values displayed by a plurality of electronic clinical thermometers; retaining means for retaining a plurality of electronic clinical thermometers in such a manner that temperature display sections of the electronic clinical thermometers are positioned on the reading means side; and moving means for moving the retaining means and reading means relative to each other so that the reading means reads the displayed values of the plurality of electronic clinical thermometers.

In another aspect of the invention, there is provided an apparatus for reading displayed values of a plurality of electronic clinical thermometers, the apparatus comprising: reading means for reading displayed values of a plurality of electronic clinical thermometers; retaining means for retaining a plurality of electronic clinical thermometers in such a manner that temperature display sections of the electronic clinical thermometers are positioned facing the reading means information generating means for generating patient identifying information corresponding to each position at which an electronic clinical thermometer is held in the retaining means; moving means for moving the retaining means and reading means relative to each other so that the reading means reads the displayed values of the plurality of electronic clinical thermometers; and means for specifying displayed values, by the patient identifying information, read by the reading means, and for outputting the displayed values so specified to an external unit.

In accordance with a preferred embodiment of the invention, the retaining means comprises a base provided with accommodating recesses for receiving the electronic clinical thermometers, the reading means being moved by the moving means above the display sections of the electronic clinical thermometers received in the accommodating recesses.

In still another aspect of the invention, there is provided an apparatus for reading displayed temperature values of an electronic clinical thermometer, comprising: reading means for reading a displayed temperature value of an electronic clinical thermometer; retaining means for retaining the electronic clinical thermometer in such a manner that a temperature display section of the electronic clinical thermometer is positioned facing in the direction of the reading means side; input means for inputting identifying a patient whose temperature is measured by the electronic clinical thermometer; memory means for storing the read displayed temperature value at an address corresponding to the code; a battery for supplying the reading means, input means and memory means with electric power; and a connector for outputting data stored in the memory means to an external unit.

In a preferred embodiment, the connector comprises a socket for a memory pack. Further, the input means inputs the patient identifying code upon reading the code, which has been recorded on a magnetic card.

Thus, in accordance with the invention, the values displayed by a plurality of sealed electronic clinical thermometers are read indirectly and converted into machine processable data. This makes it possible to supervise patient body temperature easily and accurately.

Further, measured temperature data recovered upon being correlated with the patients can be processed mechanically without human intervention. Accordingly, the displayed value reading apparatus of the invention is well-suited for application to measurement of a large number of temperatures by completely waterproof electronic clinical thermometers, and to mass sterilization of these thermometers, which are manufactured for the purpose of indiscriminate use.

In accordance with the aforementioned other aspect of the invention, the apparatus is portable and is capable of reading displayed values of a number of sealed electronic clinical thermometer in a short period of time and of converting these values into machine processable data outputted to an external unit. This eliminates the danger of clerical errors which can be caused by human intervention as well as the annoyance of writing down numerous temperature values. In accordance with a preferred embodiment, data can be transferred to a processor after being stored temporarily in a memory. This enhances processing versatility. In another preferred embodiment, the inputting of patient identifying codes can be performed through a simple operation without input errors.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a diagram showing the connection between the reading apparatus and external equipment in the embodiment of FIG. 6;

FIG. 10 is a diagram showing the connection between the reading apparatus and external equipment in another embodiment;

DESCRIPTION OF THE PREFERRED EMBODIMENTS

Embodiments of the present invention will now be described with reference to the accompanying drawings.

An ideal electronic clinical thermometer for use in the present invention is that disclosed in the specification of U.S. Pat. No. 4,574,359 the application for which was filed by the present applicant. For a fuller understanding of the present invention, this electronic clinical thermometer will be now described in detail.

Figure 14:
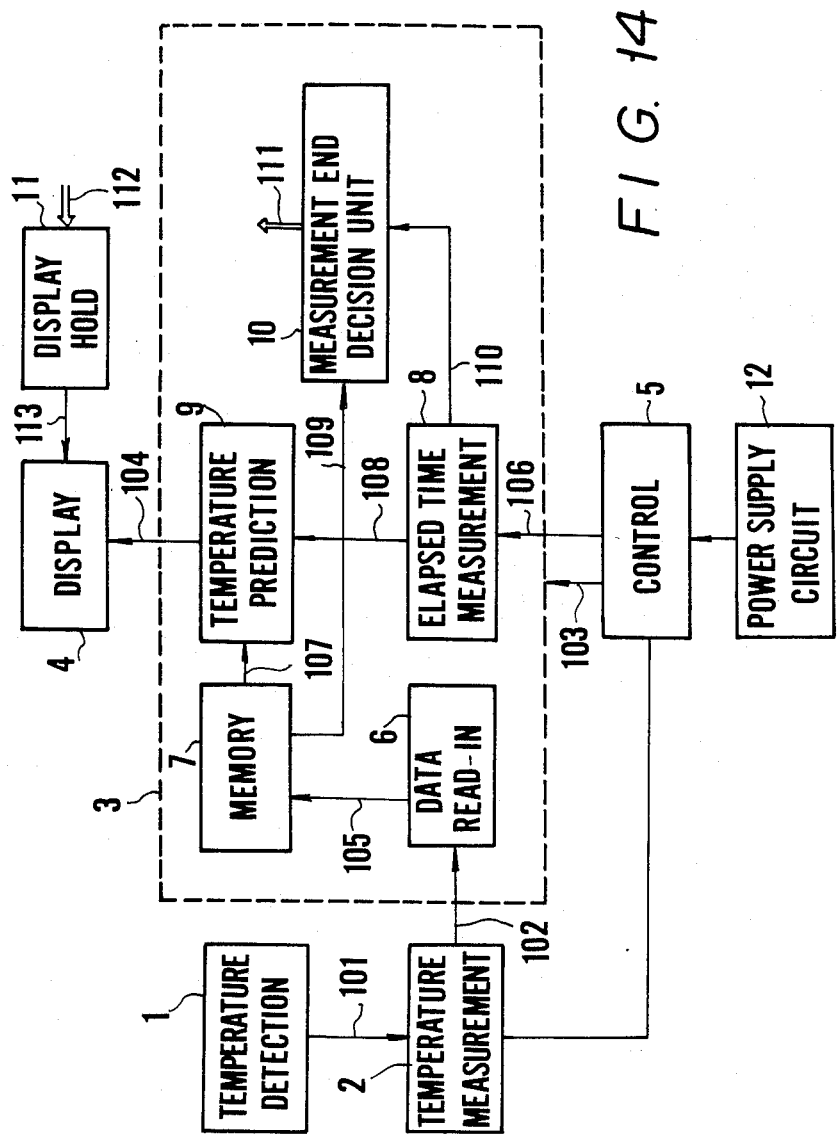
FIG. 14 is a block diagram illustrating the basic construction of an electronic clinical thermometer used in the present invention.

FIG. 14 is a block diagram illustrating the basic construction of the electronic clinical thermometer. The electronic clinical thermometer includes a temperature detecting unit 1 having a temperature responsive element, a measurement circuit 2 for converting an electrical output from the temperature detecting unit 1 into temperature data, a processor 3 for obtaining equilibrium temperature by processing the temperature data from the circuit 2, a display unit 4 for displaying the results of the data processing, and a control unit 5 for controlling the display unit 4, processor 3 and measurement circuit 2. Connected to the display unit 4 is a display holding device 11 which causes the display unit 4 to retain or "freeze" what is displayed.

The processor 3 executes processing in accordance with a control signal 103 received from the control unit 5, and includes such subunits as a data read-in unit 6, memory 7, elapsed time measurement unit 8, predicting arithmetic unit 9 and measurement end decision unit 10.

The data read-in unit 6 reads in the temperature data outputted by the measurement circuit 2, and stores the data in the memory 7. The elapsed time measurement unit 8, in response to a clock signal 106 received from the control unit 5, measures elapsed time once the processor 3 has been set into operation. Since the control unit 5 outputs the control signal 103 in response to which the processes executed by the components of the processor 3 are performed periodically as prescribed, it is obvious that this signal can be utilized in place of the clock signal 106 if desired.

The predicting arithmetic unit 9 is the key unit in the processor 3. In response to the temperature detected by the temperature detecting unit 1, the arithmetic unit 9 computes, in accordance with a temperature predicting function, the value at which temperature is predicted to finally stabilize. The measurement end decision unit 10 judges whether the conditions for ending the predicting computations in the arithmetic unit 9 have been attained. Numeral 12 denotes a power supply circuit having a power supply switch closed when the electronic clinical thermometer is removed from a case having an imbedded magnet for turning off a relay. Accordingly, when the thermometer is disposed outside a magnetic field produced within the case by the magnet, a magnetic reed relay in the power supply circuit 12 closes, thereby placing the circuit 12 in operation. This resets and starts a microcomputer constituting the control unit 5. Power continues to be supplied until the thermometer is again placed within the magnetic field. Accordingly, a measured temperature value will be held by the display holding device 11 until power is cut off from the power supply.

Figure 15:
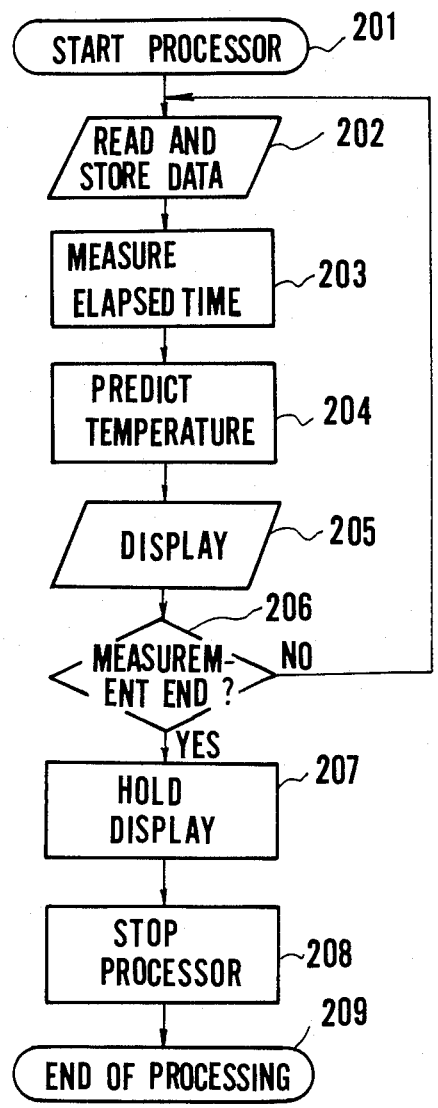
FIG. 15 is a control flowchart of the electronic clinical thermometer shown in FIG. 14.

The operation of the electronic clinical thermometer shown in FIG. 14 may be understood from the flowchart of FIG. 15. When the temperature detecting unit 1 is placed in the patient's mouth or armpit, the electrical output 101 undergoes a change. The reason for this change is the temperature-responsive element, such as a thermistor incorporated within the detecting unit 1, the electrical characteristic of which varies with temperature. The measurement circuit 2 receives the output 101 and converts it into temperature data in the form of a temperature output 102 applied to the data read-in unit 6 of the processor 3. If the processor 3 is in the operating state at this stage, the process steps indicated in FIG. 15 are implemented one after another in accordance with the control signal 103 produced by the control unit 5.

Any conditions for starting the operation of the processor 3 in step 201 may be adopted. For example, an arrangement can be adopted having a power supply switch (not shown) in which a reed switch is closed to introduce power when the switch is removed from a magnetic field at such time that the thermometer is extracted from its case. the processor can be started merely by closing a power supply switch (not shown).

Alternatively, an arrangement is possible wherein the thermometer is set into operation automatically when the temperature detected by the detecting unit 1 exhibits a change in excess of a predetermined value.

In step 202 of the flowchart, the data read-in unit 6 receives the temperature data output 102, reads in the data and, by a write signal 105, plants the new temperature data in the memory 7. The elapsed time measuring unit 8 within the processor 3 measures elapsed time in response to the clock signal 106 from the control unit 5. This is step 303, which is executed periodically, namely at the predetermined period of the clock signal 106.

In the present embodiment, the predicting arithmetic unit 9 receives the most recent temperature data stored in the memory 7, and the elapsed time measured by the elapsed time measuring unit 8, these arriving in the form of a data signal 107 and elapsed time signal 108. Using these input signals, the arithmetic unit 9 executes the predicting computations in step 204, thereby predicting what the final temperature will be upon stabilization, which will occur three to ten minutes hence, by way of example. The results are displayed on the display unit 4 in step 205.

Three conditions are used to determine the end of a temperature measurement. Specifically, (1) elapsed time must exceed a predetermined value, (2) the change in temperature must be less than a fixed value, after which (3) the most recently detected temperature data must exhibit a temperature drop in excess of a predetermined value.

If the decision rendered in step 206 is that measurement has not ended, then processing moves to a loop 210 to continue the measuring operation. In other words, even if the first and second conditions of the three conditions relating to the decision step 206 are satisfied, operation will move to the loop 210 unless the third condition also is satisfied. This third condition is satisfied in almost all cases as a result of human intervention in measurement of body temperature. Therefore, as described above in the section dealing with the temperature predicting computations, the accuracy of these computations will rise with elapsed time, and the results will be displayed on the display unit 4, so long as the user of the thermometer does not terminate the measurement of his own volition.

When it has been determined at step 206 that measurement has ended, the decision unit 10 outputs a measurement end signal 111. When this occurs, part of the signal is inputted to the display holding unit 11 as a signal 112 commanding operation of this unit. The unit 11 delivers a display hold signal 113 to the display unit 4, which responds by executing the display holding step 207, thereby to freeze the display which is being presented by the display unit at that time. Simultaneously, the measurement end signal 111 causes step 208 of the flowchart to be executed, so that at least the processor 3 ceases operating. The processor 3 thus is shut down in the final step 209.

Thus, as set forth above, the electronic clinical thermometer used in the reading apparatus embodying the present invention has an external case made of plastic and is completely waterproof. At the end of a temperature measurement, the measured value remains displayed in the display window of the display unit, which comprises a liquid crystal display device.

The apparatus for reading the measured temperature value displayed by such an electronic clinical thermometer will now be described.

Figure 1:
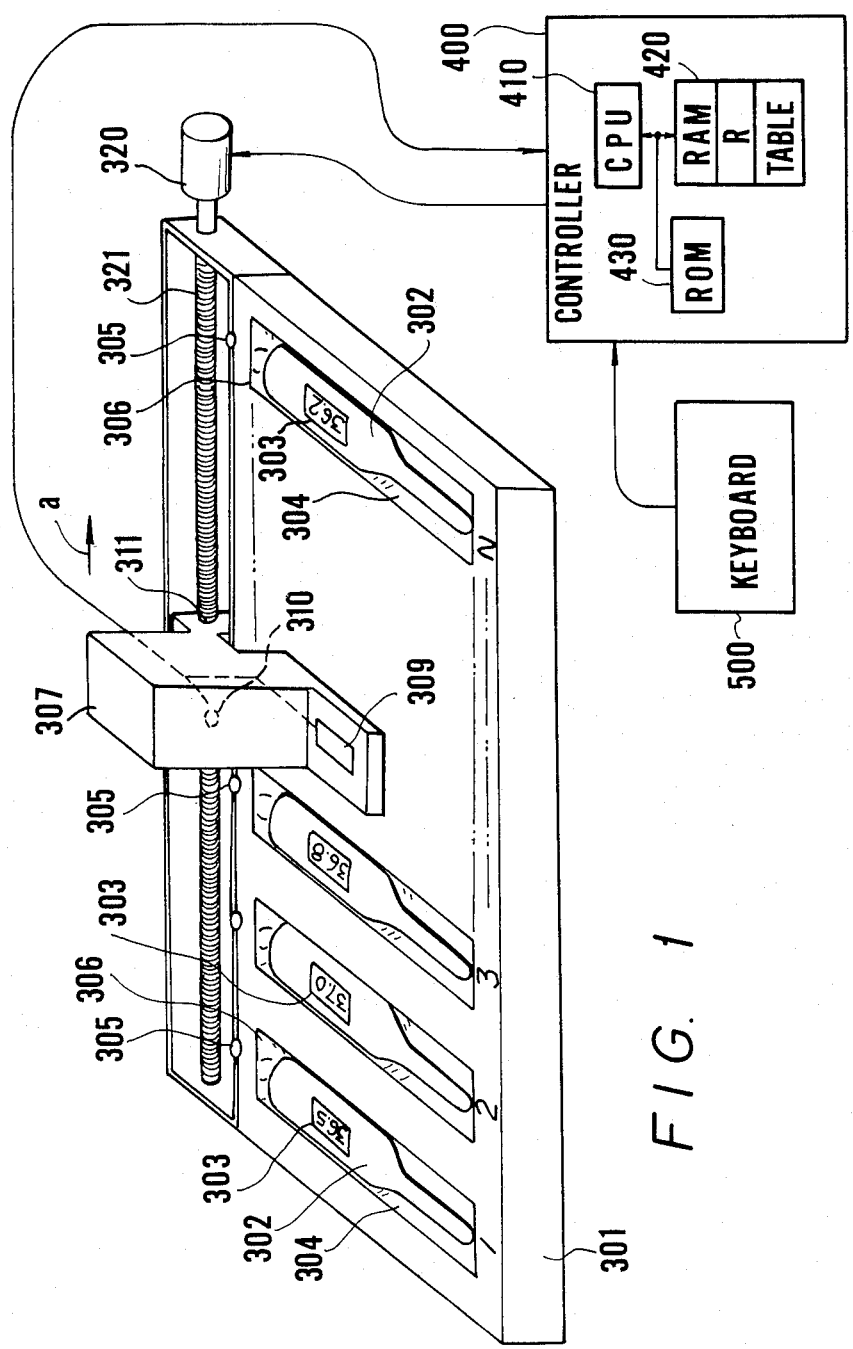
FIG. 1 is a perspective view illustrating the basic construction of an apparatus for reading values displayed by electronic clinical thermometers in accordance with an embodiment of present invention.

In FIG. 1, numeral 301 denotes a base on which electronic clinical thermometers 302 are placed. The base 301 is provided with a plurality of accommodating recesses 304 for receiving respective ones of the electronic clinical thermometer 302, each of which has a temperature display window 303 facing in the direction of a reader (described below). The recesses 304 are arrayed in a row and are assigned consecutive identification numbers 1 through N, each of which corresponds to a bed number on a hospital floor. Accordingly, a thermometer for a patient assigned to a Bed No. 1 would be placed in the accommodating recess numbered "1". Each accommodating recess 304 is provided with a single identification lamp 305 which lights when the thermometer 302 is placed in the recess. As will be described below, a traveling holder 307 stops upon detecting a lighted lamp 305 and then proceeds to read the temperature value displayed by the thermometer corresponding to the lighted lamp.

Each recess 304 has an end portion 306 which extends beyond the rear end of the electronic clinical thermometer 302 so that the thermometer can be extracted from the recess easily by the finger of the operator. The aforementioned holder 307 holds a reader 309 including a light source for eliminating the display window 303 of the thermometer 302 and an image pick-up element such as a CCD for photoelectrically reading the temperature displayed by the liquid crystal in the display window 303 of the thermometer 302, and a photosensor 310 for sensing the position at which reading is taking place. The holder 307 is adapted to move the reader 309 and photosensor 310 from left to right in FIG. 1. The holder 307 has a threaded bore 311 threadedly engaged with a feed screw 321 driven rotatively by a motor 320 and reads the displayed temperature values while successively scanning the plural electronic clinical thermometers 302 in the direction of arrow a.

Figures 2, 3:
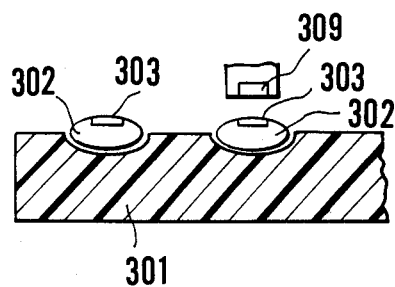
FIG. 2 is a sectional view of reading means constituting part of the apparatus shown in FIG. 1.
FIG. 3 is a view showing the organization of a file of stored body temperature data.

FIG. 2 is a sectional view illustrating the relationship between the reader 309 provided in the holder and the display window 303 of the electronic clinical thermometer 302. The reader 309 having the image pick-up element and the light source is so arranged as to read the temperature value displayed in the opposing display window 303.

Returning to FIG. 1, there is shown at numeral 400 a controller for control, memory and data processing functions. The controller 400 includes a microprocessor (CPU) 410, a RAM 420 having an area for storing processed data and a working area for the CPU 410, and a ROM 430 storing a control program illustrated by the flowchart of FIG. 4. The controller 400 is connected to a keyboard 500 and is adapted to write the read temperature display value data into a table of the kind shown in FIG. 3 created in RAM 420 in response to a command from the keyboard 500.

Figure 4:
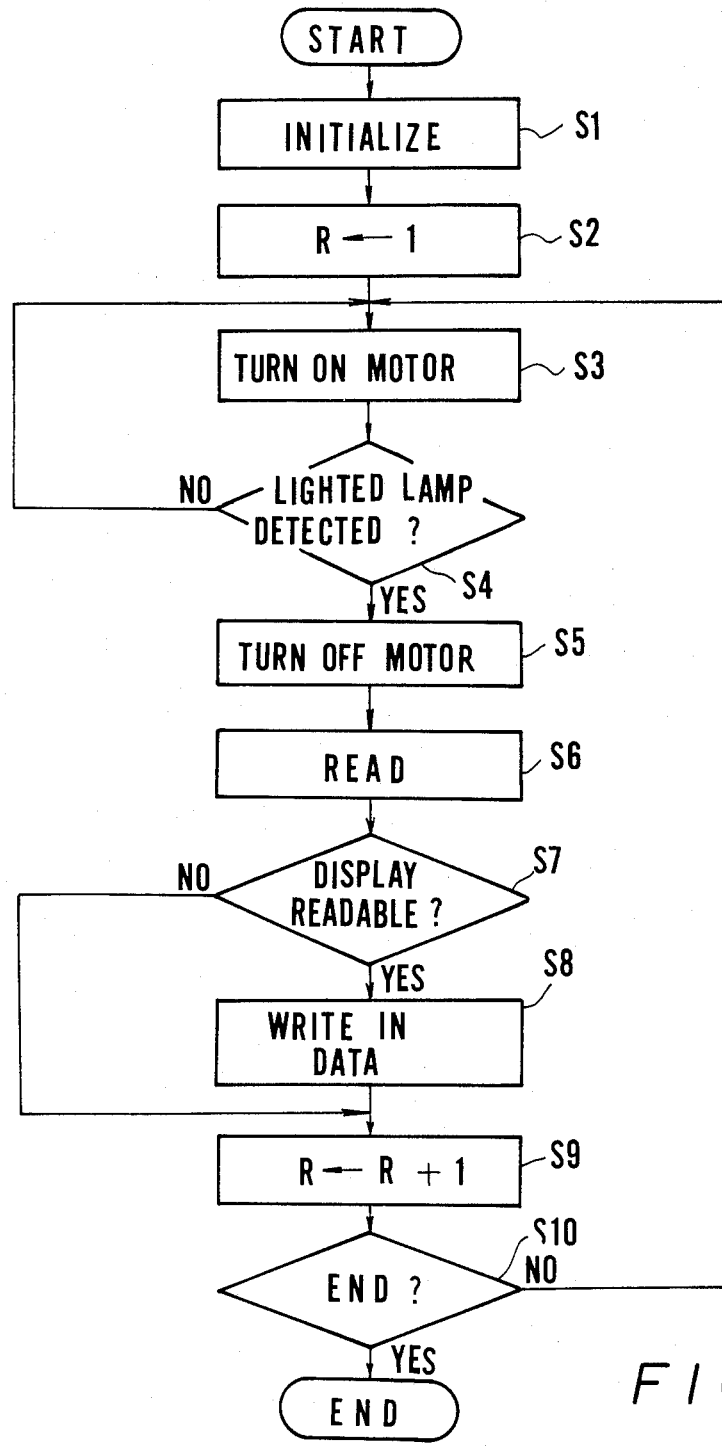
FIG. 4 is a flowchart illustrating the operation of the apparatus shown in FIG. 1.

An example of data processing will now be described with reference to FIGS. 3 through 5.

First, the keyboard 500 is used to create a data file for each floor of the hospital. As shown in FIG. 3, the data file includes a table comprising patient names and body temperature data corresponding to bed numbers. An electronic clinical thermometer collected from Bed No. 1 is set in the No. 1 accommodating recess 304 of base 301, the temperature displayed by this thermometer is read and is written into the data section of the table at Bed No. 1. The name column of the file is updated when a patient is admitted to or discharged from the hospital or when a patient's bed number is changed. A name is registered by using the keyboard 500 to designate the proper number.

The processing procedure will now be described in accordance with FIG. 4.

When the reading of displayed temperature values is started by operating the keyboard 500, the CPU 410 executes initialization at step S1 and causes the holder 307 to wait at a starting position on the left side (the side corresponding to recess No. 1) of the base 301. The program then proceeds to a step S2, at which "1" is set in a register R of the CPU 410 in order to designate a table address. The purpose of this is to inform the CPU 410 of the fact that the thermometer to be read next is that used by the patient occupying Bed No. 1, namely the thermometer in recess 304 having the I.D. No. 1. Next, the motor 320 is driven into operation at a step S3 to transport the holder 307 in the direction of arrow a. It is then determined at a step S4 whether a lighted lamp 305 has been detected. If the answer is YES, this means that the reader 309 is situated above the display window 3 of a thermometer that is to be read. Accordingly, the motor 320 is stopped at a step S5 and the controller 400 sends a read signal to the reader 309, which responds by reading the temperature display in the display window 303 at a step S6. This is followed by a step S7, at which it is determined whether the displayed value is distinguishable. If it is, then the CPU 410 retrieves the file (FIG. 3) and, at a step S8, writes the temperature data into the data area corresponding to the table number designated by register R. This is followed by a step S9. If the displayed temperature value is found to be indistinguishable at the step S7, this means that the value cannot be read because the electronic clinical thermometer 302 is not present in the accommodating recess 304 or is present but does not have its display window 303 properly positioned. In such case, the program skips step S8 and proceeds to the step S9. This step calls for the register R to be incremented by +1 in order to update the table address and prepare for the reading of the next thermometer. The program then proceeds to a step S10, at which it is determined whether the reading of the thermometers has ended. If the answer is NO, the program returns to step S3 to repeat the foregoing processing from step S3 onward.

Figure 5:
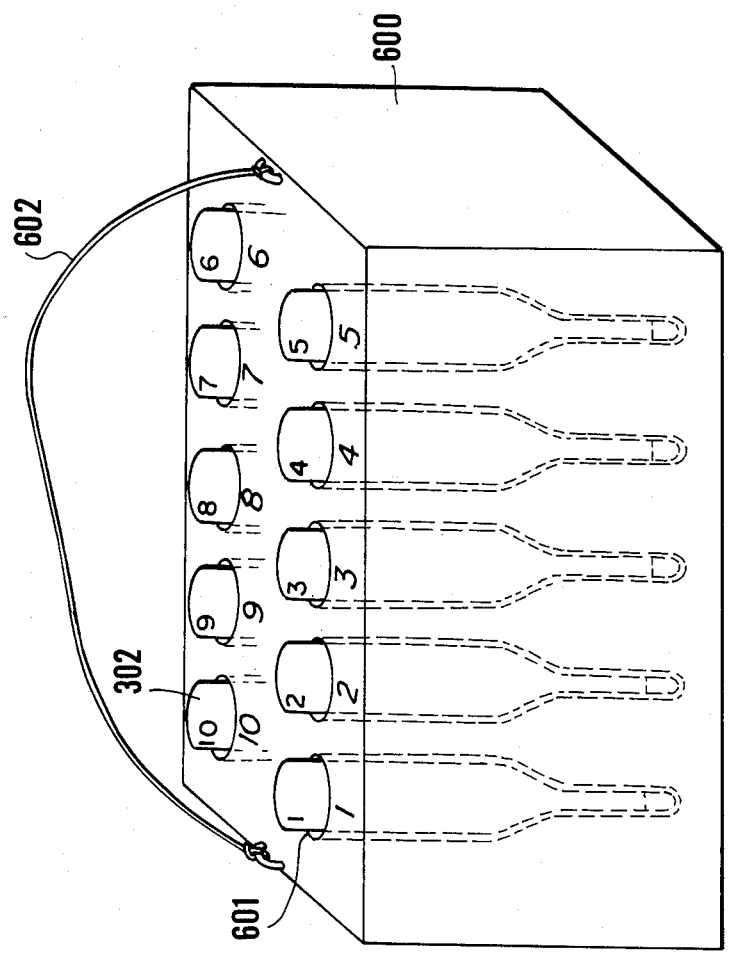
FIG. 5 is a perspective view showing a preferred carrying case used together with the apparatus of the invention.

FIG. 5 illustrates a preferred carrying case 600 for carrying the electronic clinical thermometers 301 used together with the displayed value reading apparatus described above. In the embodiment of FIG. 5, the carrying case 600 is provided with ten pockets 601 for receiving the thermometers 302. The case 600 is also provided with a strap 602 to facilitate the carrying thereof. Numbers matching those printed on the electronic clinical thermometers 302 are also printed near the pockets 601 into which the corresponding thermometers 302 are to be inserted. The thermometers 302 are distributed among patients occupying beds having bed numbers corresponding to the thermometer numbers. At the end of body temperature measurement, the thermometers are collected and inserted in the pockets 601 having the corresponding numbers. When all of the distributed thermometers have thus been collected, the carrying case 600 is carried to a central location and the electronic clinical thermometers 302 are transferred from the case 600 to the correspondingly numbered recesses 304 in the base 301 of the displayed value reading apparatus. When all of the thermometers have thus been set in the recesses 304 and positioned so that their display windows 303 face upward toward the reader, the operator uses the keyboard 500 to issue a reading start command. Thereafter, the displayed value reading apparatus automatically reads the displays of the thermometers 302 in successive fashion and stores the read values in the table of RAM 420 of controller 400. It should be noted that various output units such as a monitor and printer can be connected to the controller 400 to display and record the stored temperature data in the form of statistical results.

It goes without saying that the apparatus shown in FIG. 1 can itself serve as a carrying case. If the thermometers collected from the patients are placed in the recesses 304 in the same order in which they were extracted, numbering of the thermometers is unnecessary.

Figure 6:
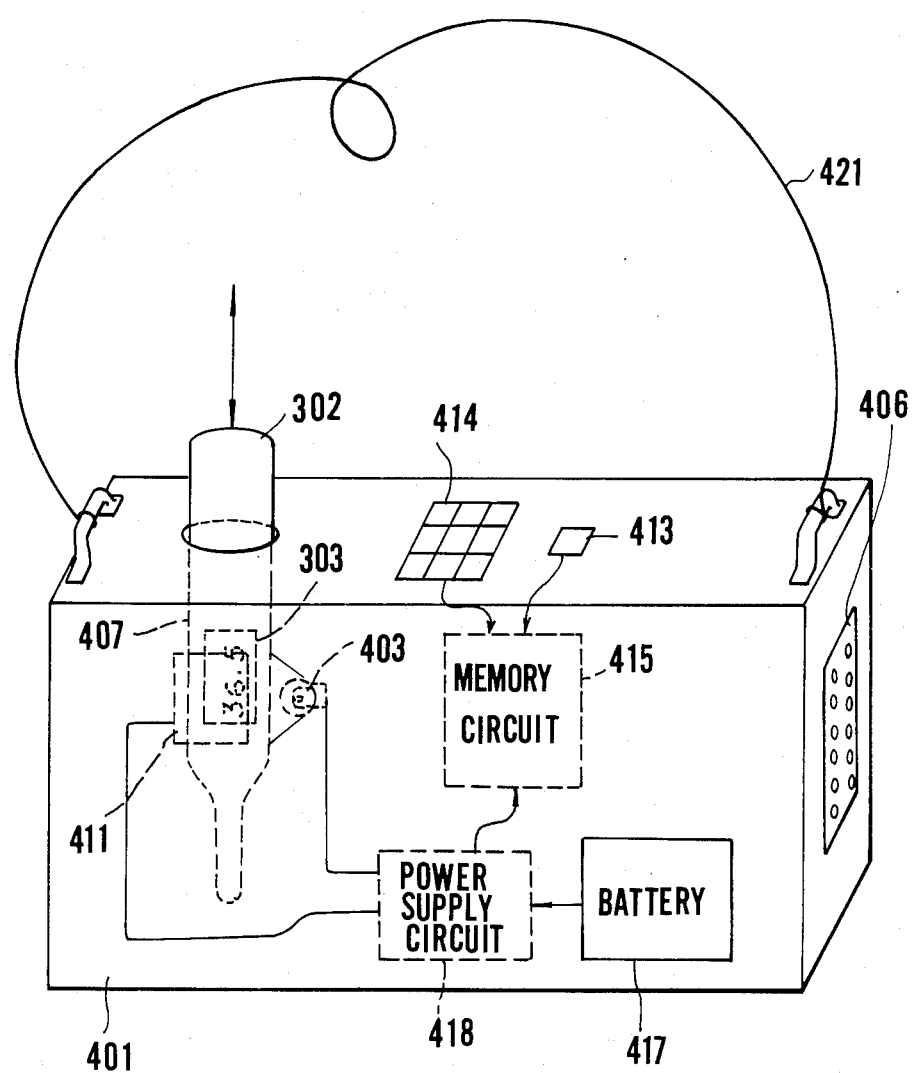
FIG. 6 is a perspective view illustrating the basic construction of an apparatus for reading values displayed by electronic clinical thermometers in accordance with another embodiment of the present invention.

FIG. 6 is a perspective view illustrating the general features of another embodiment of an apparatus 401 for reading the temperature display of an electronic clinical thermometer in accordance with the invention. Provided on the exterior of the apparatus 401 are a connector 406 for connecting the apparatus to external equipment, an accommodating pocket 407 for accommodating the electronic clinical thermometer 302, a set of numeric keys 414 for inputting a patient code, an input key 413 and a strap 421 for carrying the apparatus. Provided internally of the apparatus are a photoelectric converting-type pick-up element 411 and an illuminating lamp 403 for reading a value displayed in the display window 303 of the electronic clinical thermometer 302, a memory circuit 415 into which a read temperature value is written at an address generated by the code inputted from the numeric keys 414 for patient code input, a battery 417 serving as the power supply of the apparatus, and a power supply circuit 418 for supplying each of the abovementioned circuits and electrical components with a predetermined voltage from the battery 417.

Figure 7:
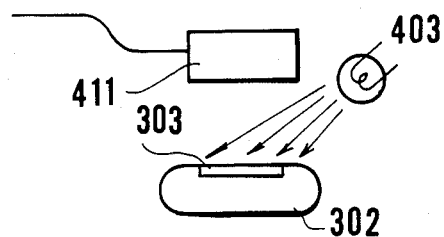
FIG. 7 is a view of reading means constituting part of the apparatus shown in FIG. 6.

FIG. 7 is a detailed view of the illuminating lamp 403 and image pick-up element 411 for reading the temperature value displayed in the display window 303 of the electronic clinical thermometer 302 inserted in the accommodating pocket 407 at a predetermined position. Though not illustrated, it is possible to provide an optical device such as a lens if necessary.

Figure 8:
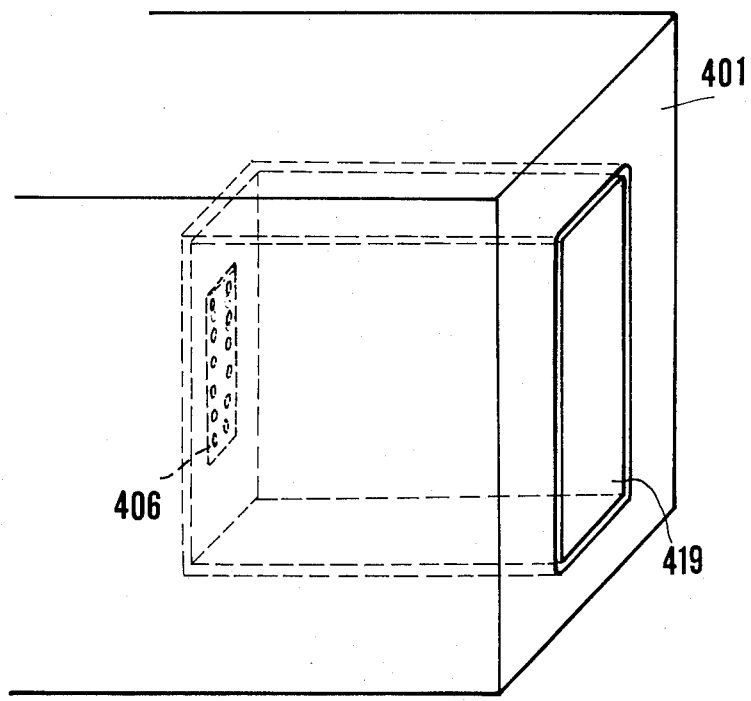
FIG. 8 is a perspective view showing the side portion of the apparatus in another embodiment of the invention.

FIG. 8 is a perspective view showing the side portion of the reading apparatus 401 in yet another embodiment of the invention, in which there is provided a freely detachable memory device 419, with the connector 406 provided inside the apparatus 401 serving as a socket for the memory device. Preferably, the memory device 419 comprises a RAM backed up by a battery, or a so-called "RAM pack". A RAM pack can also be used as the memory circuit 415 in FIG. 6.

FIG. 9 is a view showing a connection using a pair of connectors 423, 424 for reading in a measured temperature value and patient code, outputted by the connector 406 of reading apparatus 401, via a connector 425 provided on a main data processing unit 422. By thus making the simple connection shown in the drawing, temperature data corresponding to a patient code can be supplied to the data processing unit located inside or outside the hospital. This makes it possible to input various data from other apparatus and to perform general supervision of the data.

FIG. 10 is an illustrative example in which use is made of the memory device 419 arranged in the form of a cassette using a RAM pack or the like backed up by a battery. By extracting the memory device 419 from the connector 406 of reading apparatus 401 and plugging it into the connector 423 provided on the side of the main data processing unit 422, the contents of the memory device 419 can be transferred to the main data processing unit 422. By thus using the cassette-type memory device 419, temperature data can be transferred to the main data processing unit 422 even if the processing unit is located remote from the site where the temperature measurements are taken. Though some time will be required for the writing and reading of the temperature data, a compact magnetic tape storage device referred to as a microcassette or a microfloppy disc device can be provided within the reading apparatus 401 so that the temperature data can be transferred to the remote main data processing unit 422 via either of the aforementioned magnetic media.

Figure 11:
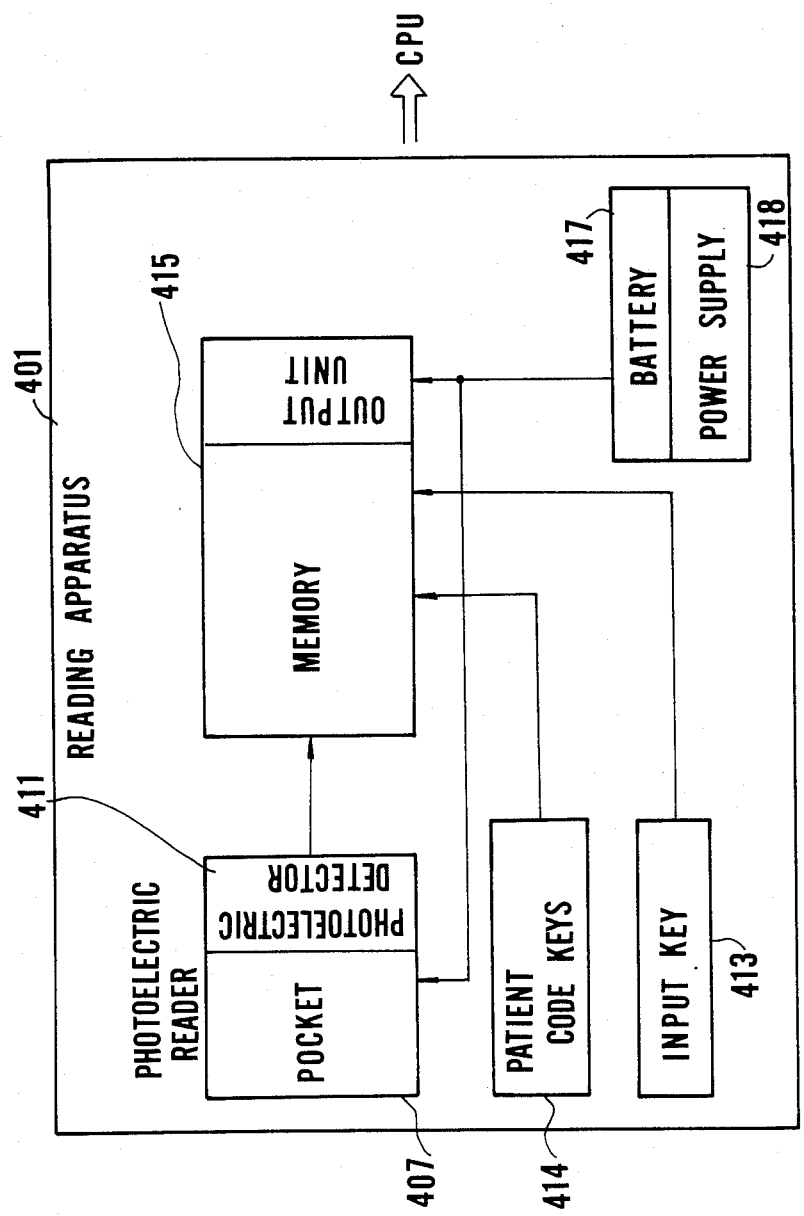
FIG. 11 is a block diagram of the reading apparatus in the embodiment of FIG. 6.

FIG. 11 is a block diagram of the reading apparatus 401 of the embodiment shown in FIG. 6 and illustrates the apparatus in integrated form. The operation of the reading apparatus 401 will now be described in detail with reference to the flowchart of FIG. 12.

To read the electronic clinical thermometer 302 collected from a patient, the thermometer 302 is set in the pocket 407, the patient code is inputted by using the numberic keys 414, and the input key 413 is pressed. Alternatively, the patient code can be inputted first using the numeric keys 414, then the input key 413 can be pressed, followed by setting the thermometer 302 in the pocket 407 to start the reading operation. Though not shown, a detecting mechanism can be provided for detecting that the thermometer has been set in the pocket 407 correctly.

Figure 12:
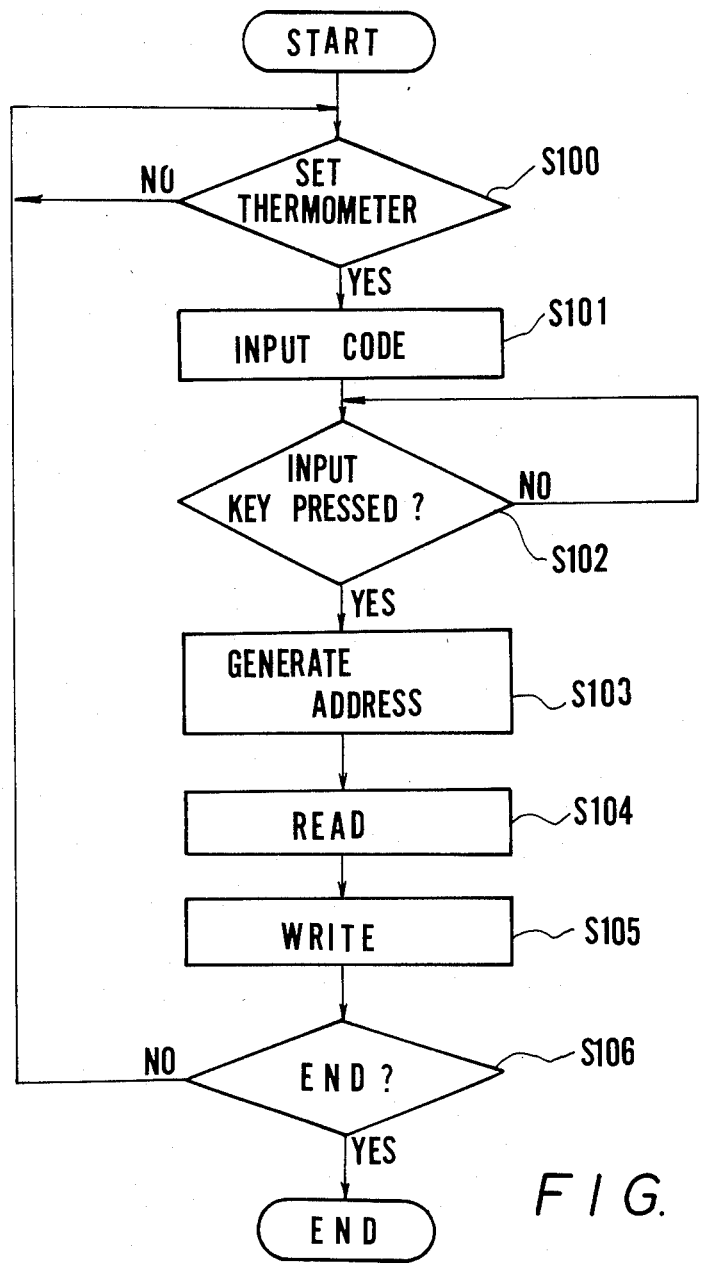
FIG. 12 is a flowchart illustrating the operation of the reading apparatus in the embodiment of FIG. 6.

The foregoing operation corresponds to steps S100 through S102 of the flowchart shown in FIG. 12. Specifically, the thermometer is set in the pocket 407 at step S100 and the patient code is inputted at step S101 using the numeric keys. When pressing of the input key 413 is confirmed at step S102, an address corresponding to the patient code inputted at step S101 is generated at step S103. Thereafter, the value displayed in the display window 303 of the thermometer is read by the photoelectric converting-type pick-up element 411 at step S104. This is followed by step S105, at which the value read is stored in the memory circuit 415 at an address corresponding to the patient code. Next, step S106 calls for a determination as to whether further reading is to be performed. If reading is to be performed, the program returns to step S100. It should be noted that an output unit 416 in FIG. 11 functions as an interface for supplying external equipment with the data stored in the memory circuit 415 and comprises a connector for connection to the external equipment.

In the present embodiment, the method of identifying patients is to input a patient code using the numeric keys. However, the invention is not limited to such an arrangement, for a patient code can be read from a magnetic card, as shown in FIG. 13.

Figure 13:
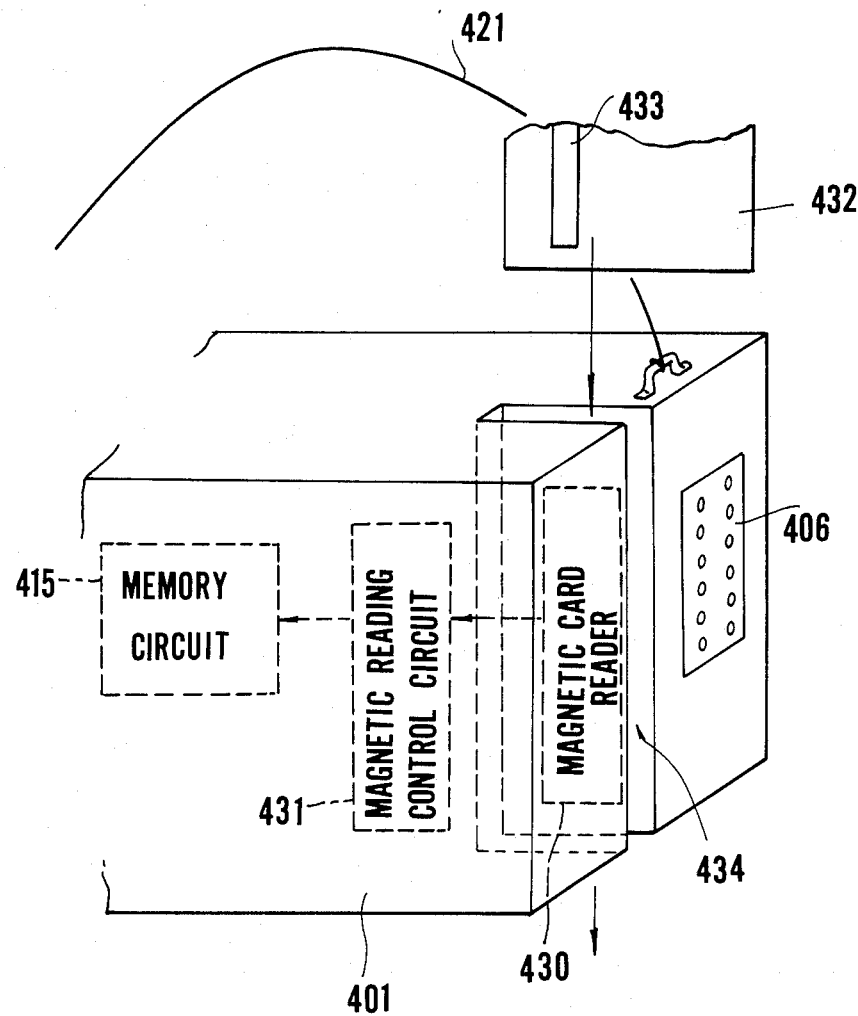
FIG. 13 is a view illustrating an example in which a patient identifying code is inputted from a magnetic card.

In FIG. 13, the reading apparatus 401 is capable of reading a magnetic card 432 on which is magnetically recorded a patient code and the like. The magnetic card 432 is hung, say, at the end of a patient's bed at all times. A reader 430 for reading the card 432 is adapted to read information from a magnetic recording portion 433 of card 432 when the card is moved through a slot 420 as by a manual operation, and to send the information to a magnetic reading control circuit 431. The latter converts the data from the card reader 433 into e.g. a binary number and stores the same as a patient indentification code in the memory 415. Thus, when a nurse collects the thermometer from a patient at the end of a temperature measurement, the nurse takes the magnetic card 432 from the end of the patient's bed at the same time and uses the card to read in the identification code of the patient. This is a very simple operation that does not require an input from numeric keys.

Thus, in accordance with the present invention as described above, the values displayed by a plurality of sealed electronic clinical thermometers are read indirectly and converted into machine processable data. This makes it possible to supervise patient body temperature easily and accurately.

Further, measured temperature data recovered upon being correlated with the patients can be processed mechanically without human intervention. Accordingly, the displayed value reading apparatus of the invention is well-suited for application to measurement of a large number of temperatures by completely waterproof electronic clinical thermometers, and to mass sterilization of these thermometers, which are manufactured for the purpose of indiscriminate use.

In accordance with another aspect of the invention, the apparatus is portable and is capable of reading displayed values of a number of sealed electronic clinical thermometer in a short period of time and of converting these values into machine processable data outputted to an external unit. This eliminates the danger of clerical errors which can be caused by human intervention as well as the annoyance of writing down numerous temperature values. In accordance with a preferred embodiment, data can be transferred to a processor after being stored temporarily in a memory. This enhances processing versatility. In another preferred embodiment, the inputting of patient identifying codes can be performed through a simple operation without input errors.

As many apparently widely different embodiments of the present invention can be made without departing from the spirit and scope thereof, it is to be understood that the invention is not limited to the specific embodiments thereof except as defined in the appended claims.

WHAT WE CLAIM IS:

1. An apparatus for reading temperature values displayed by a plurality of electronic clinical thermometers, comprising:
    reading means for reading temperature values displayed by a plurality of electronic clinical thermometers;
    retaining means for retaining a plurality of electronic clinical thermometers in such a manner that temperature display sections of the electronic clinical thermometers are positioned facing in the direction of the reading means; and
    moving means for moving said retaining means and reading means relative to each other so that said reading means reads the temperature values displayed by the plurality of electronic clinical thermometers.

2. The apparatus according to claim 1, wherein said retaining means comprises a base provided with accommodating recesses for receiving respective ones of the electronic clinical thermometers, said reading means being moved by said moving means above the display sections of the electronic clinical thermometers received in said accommodating recesses.

3. The apparatus according to claim 1, further comprising indicating means for each of said accommodating recesses for indicating whether an electronic clinical thermometer is present in the corresponding accommodating recess, said moving means deciding reading positions of the temperature values displayed by the electronic clinical thermometer on the basis of indications given by said indicating means.

4. The apparatus according to claim 1, wherein said temperature display section comprises a liquid crystal display device.

5. The apparatus according to claim 4, wherein said reading means comprises a light source for illuminating said liquid crystal display device, and a photoelectric converting element for reading light reflected from said liquid crystal display device.

6. An apparatus for reading temperature values displayed by a plurality of electronic clinical thermometers, comprising:
   reading means for reading temperature values displayed by a plurality of electronic clinical thermometers;
   retaining means for retaining a plurality of electronic clinical thermometers in such a manner that temperature display sections of the electronic clinical thermometers are positioned facing in the direction of the reading means;
   information generating means for generating patient identifying information corresponding to each position at which an electronic clinical thermometer is held in the retaining means;
   moving means for moving said retaining means and reading means relative to each other so that said reading means reads the temperature values displayed by the plurality of electronic clinical thermometers; and
   memory means for specifying, by said patient identifying information, displayed temperature values read by said reading means, and for storing the displayed temperature values so specified.

7. An apparatus for reading temperature values displayed by a plurality of electronic clinical thermometers, comprising:
   reading means for reading temperature values displayed by a plurality of electronic clinical thermometers;
   retaining means for retaining a plurality of electronic clinical thermometers in such a manner that temperature display sections of the electronic clinical thermometers are positioned facing in the direction of the reading means;
   information generating means for generating patient identifying information corresponding to each position at which an electronic clinical thermometer is held in the retaining means;
   moving means for moving said retaining means and reading means relative to each other so that said reading means reads the temperature values displayed by the plurality of electronic clinical thermometers; and
   means for specifying, by said patient identifying information, displayed temperature values read by said reading means, and for outputting to an external unit the displayed temperature values so specified.

8. An apparatus for reading a temperature value displayed by an electronic clinical thermometer, comprising:
   reading means for reading a temperature value displayed by an electronic clinical thermometer;
   retaining means for retaining the electronic clinical thermometer in such a manner that a temperature display section of the electronic clinical thermometer is positioned to face said reading means;
   input means for inputting a code identifying a patient whose temperature is measured by the electronic clinical thermometer;
   memory means for storing the read displayed temperature value at an address corresponding to the code;
   a battery for supplying said reading means, said input means and said memory means with electric power; and
   a connector for outputting data stored in said memory means to an external unit.

9. The apparatus according to claim 8, wherein said connector comprises a socket for a memory pack.

10. The apparatus according to claim 8, wherein said input means is a magnetic card reader for inputting the patient identifying code upon reading the code, which has been recorded on a magnetic card.

11. The apparatus according to claim 8, wherein the apparatus is portable in its entirety.

12. The apparatus according to claim 8, wherein said temperature display section comprises a liquid crystal display device.

13. The apparatus according to claim 12, wherein said reading means comprises a light source for illuminating said liquid crystal display device, and a photoelectric converting element for reading light reflected from said liquid crystal display device.

* * * * *

UNITED STATES PATENT AND TRADEMARK OFFICE
CERTIFICATE OF CORRECTION

PATENT NO.  : 4,761,526
DATED       : August 2, 1988
INVENTOR(S) : Y. MURAMOTO

It is certified that error appears in the above-identified patent and that said Letters Patent is hereby corrected as shown below:

```
Column 1, line 53, delete "on the reading means side" insert
                  -- facing the reading means --
          line 66, after "means" insert -- ; --
Column 2, line 25, delete "side"
          line 26, after "inputting" insert -- a code --
Column 7, line 21, delete "3" insert -- 303 --
```

Signed and Sealed this

Twenty-first Day of February, 1989

*Attest:*

DONALD J. QUIGG

*Attesting Officer*  *Commissioner of Patents and Trademarks*